(12) United States Patent
Rayl (10) Patent No.: US 6,915,781 B2
(45) Date of Patent: Jul. 12, 2005

(54) ENGINE CONTROL SYSTEM WITH THROTTLE PRELOAD DURING CYLINDER DEACTIVATION

(75) Inventor: Allen B. Rayl, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 78 days.

(21) Appl. No.: 10/150,522

(22) Filed: May 17, 2002

(65) Prior Publication Data

US 2003/0213466 A1 Nov. 20, 2003

(51) Int. Cl.[7] .................................................. F02D 9/08
(52) U.S. Cl. .................. 123/399; 123/481; 123/198 F; 123/319; 123/491; 123/688; 73/116; 73/117.2; 73/117.3
(58) Field of Search ............................... 123/399, 417, 123/481, 198 F, 319, 491, 688, 406.65; 73/116, 117.3, 118.2

(56) References Cited

U.S. PATENT DOCUMENTS

| | | | |
|---|---|---|---|
| 5,374,224 A | 12/1994 | Huffmaster et al. ......... 477/181 |
| 5,398,544 A | 3/1995 | Lipinski et al. ............. 73/118.2 |
| 5,408,966 A | 4/1995 | Lipinski et al. .......... 123/198 F |
| 5,408,974 A | 4/1995 | Lipinski et al. ............. 123/481 |
| 5,431,139 A | 7/1995 | Grutter et al. ........... 123/198 F |
| 5,431,141 A * | 7/1995 | Kanazawa et al. .......... 123/399 |
| 5,437,253 A | 8/1995 | Huffmaster et al. ......... 123/399 |
| 5,568,795 A | 10/1996 | Robichaux et al. ...... 123/198 F |
| 5,769,054 A | 6/1998 | Schnaibel et al. ........... 123/417 |
| 6,332,450 B1 * | 12/2001 | Muto et al. .................. 123/352 |
| 6,499,461 B2 * | 12/2002 | Kubota et al. .............. 123/361 |
| 2002/0162540 A1 * | 11/2002 | Matthews et al. .......... 123/481 |

FOREIGN PATENT DOCUMENTS

EP            0731265 A2    9/1996

OTHER PUBLICATIONS

Watanabe/Fukutani, SAE Technical Paper Series 820156, Cylinder Cutoff of 4–Stroke Cycle Engines at Part–Load and Idle, Feb. 22–26, 1982.

* cited by examiner

Primary Examiner—Tony M. Argenbright
Assistant Examiner—Johnny H. Hoang
(74) Attorney, Agent, or Firm—Christopher DeVries (57) ABSTRACT

An engine control system and method for a displacement on demand internal combustion engine includes a throttle preload signal generator that outputs a throttle preload area signal having a base portion and ramp out portion. A combining circuit combines the throttle preload area signal with a current throttle area signal to generate a throttle preload difference signal that adjusts throttle area to smooth transitions during at cylinder deactivation. The engine control system smoothes the transition between activated and inactivated modes by increasing throttle area and manifold pressure when transitioning between activated and deactivated modes.

20 Claims, 9 Drawing Sheets

ENGINE CONTROL SYSTEM WITH THROTTLE PRELOAD DURING CYLINDER DEACTIVATION

FIELD OF THE INVENTION

The present invention relates to engine control systems for internal combustion engines, and more particularly to throttle preload in cylinder deactivation engine control systems.

BACKGROUND OF THE INVENTION

Some internal combustion engines include engine control systems that deactivate cylinders under low load situations. For example, an eight cylinder can be operated using four cylinders. Cylinder deactivation improves fuel economy by reducing pumping losses.

To smoothly transition between activated and deactivated modes, the internal combustion engine must produce torque with a minimum of disturbances. Otherwise, the transition will not be transparent to the driver. In other words, excess torque will cause engine surge and insufficient torque will cause engine sag, which degrades the driving experience.

For example for an eight-cylinder engine, intake manifold pressure is significantly lower during eight-cylinder operation than during four-cylinder operation. During the transition from eight to four cylinders, there is a noticeable torque reduction or sagging in four-cylinder operation until the intake manifold reaches a proper manifold pressure level.

SUMMARY OF THE INVENTION

An engine control system and method according to the present invention for a displacement on demand engine includes a throttle preload signal generator that outputs a throttle preload area signal having a base portion and ramp out portion. A combining circuit combines the throttle preload area signal with a current throttle area signal to generate a throttle preload difference signal that adjusts throttle area to smooth transitions during at least one of cylinder activation and deactivation.

In other features of the invention, the throttle preload area signal further includes a ramp in portion which reduces throttle noise. A preload throttle area generator provides a preload area based on rpm and a desired air per cylinder. A preload duration generator provides a preload base duration signal based on rpm and a desired air per cylinder.

In still other features, an adaptive throttle preload generator receives a measured air per cylinder and a desired air per cylinder and outputs an adjusted air per cylinder. The adjusted air per cylinder is input to an inverting input of a summing circuit. The desired air per cylinder is input to a non-inverting input of the summing circuit. The summing circuit outputs the adjusted desired air per cylinder to the preload throttle area generator and the preload duration generator.

In yet other features, a ramp generator receives the preload area signal and the preload duration signal. A ramp in calibration circuit provides a ramp in period. A ramp out calibration circuit provides a ramp out period.

In yet other features, an offset circuit generates an offset period. A mode actuator generates a holdoff complete signal at the offset period before an end of the preload base duration signal. Alternately, an offset circuit generates an offset period that is input to the mode actuator. A comparator generates a signal when a measured air per cylinder exceeds a desired air per cylinder. An OR circuit that is coupled to the mode actuator and the comparator generates a holdoff complete signal if the measured air per cylinder exceeds the desired air per cylinder or at the offset period before an end of the preload base duration signal. A correction circuit adjusts the preload throttle area for variations in at least one of temperature and barometric pressure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, activated refers to operation using all of the engine cylinders and deactivated refers to operation using less than all of the cylinders of the engine (one or more cylinders not active).

The engine control system according to the present invention reduces torque disturbances during cylinder deactivation by preloading the throttle (or manifold). As a result, the engine operates at an estimated air per cylinder for an activated mode (such as an 8 cylinder mode) prior to a transition to a deactivated mode (such as a 4 cylinder mode). The engine control system also increases spark retard as the throttle opens and the manifold fills. The spark retard reduces torque to maintain the same desired brake torque. As can be appreciated, the present invention has application to engines having additional or fewer cylinders such as four, six, ten and twelve cylinders.

Figure 1:
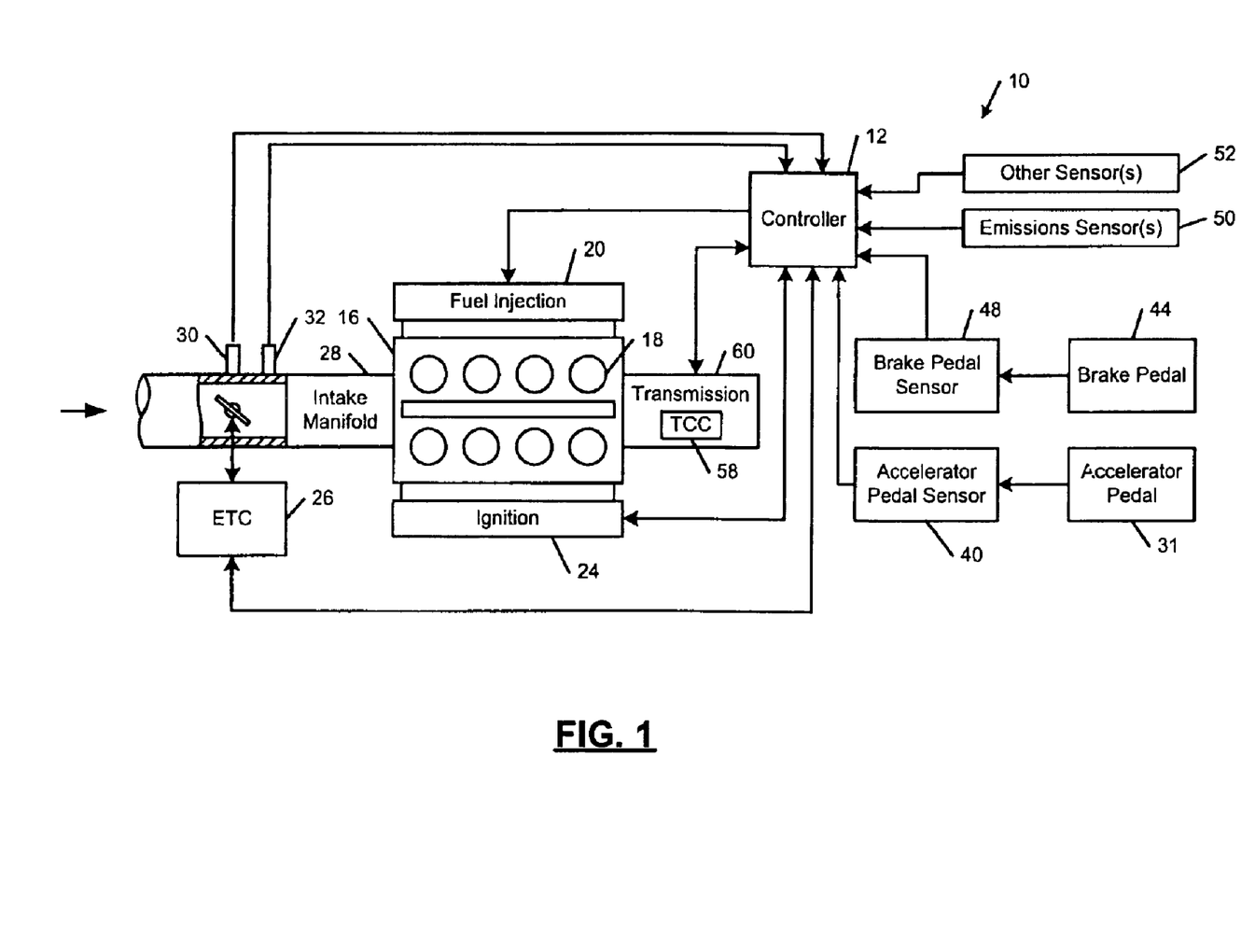
FIG. 1 is a functional block diagram of an engine control system that preloads the throttle during cylinder activation and deactivation according to the present invention.

Referring now to FIG. 1. an engine control system 10 according to the present invention includes a controller 12 and an engine 16. The engine 16 Includes a plurality of cylinders 18 each with one or more intake valves and/or exhaust valves (not shown). The engine 16 further includes a fuel injection system 20 and an ignition system 24. An electronic throttle controller (ETC) 26 adjusts a throttle area in an intake manifold 28 based upon a position of an accelerator pedal 31 and a throttle control algorithm that is executed by the controller 12. One or more sensors 30 and 32 such as a manifold pressure sensor and/or a manifold air temperature sensor sense pressure and/or air temperature in the intake manifold 20.

A position of the accelerator pedal 31 is sensed by an accelerator pedal sensor 40, which generates a pedal position signal that is output to the controller 12. A position of a brake pedal 44 is sensed by a brake pedal sensor 48, which generates a brake pedal position signal that is output to the controller 12. Emissions system sensors 50 and other sensors 52 such as a temperature sensor, a barometric pressure sensor, and other conventional sensor and/or controller signals are used by the controller 12 to control the engine 16. An output of the engine 16 is coupled by a torque converter clutch 58 and a transmission 60 to front and/or rear wheels.

Figure 2:
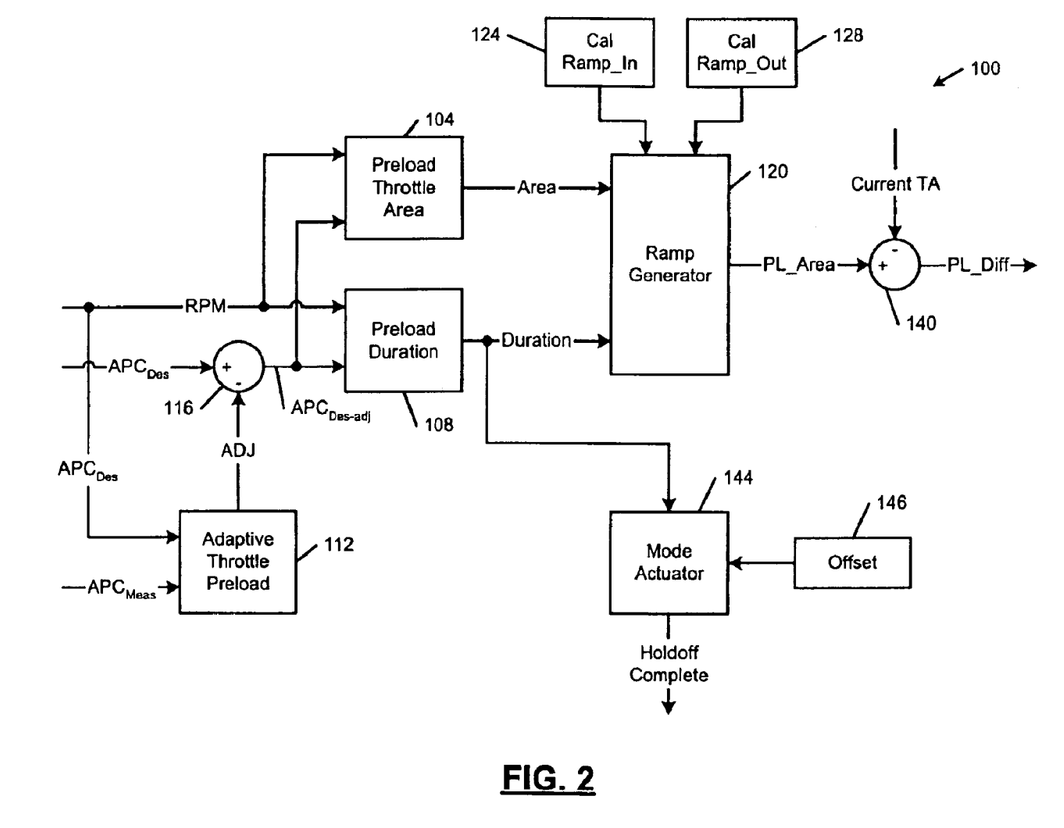
FIG. 2 is a functional block diagram of a throttle preload signal generator according to the present invention.

Referring now to FIG. 2, a preload signal generator 100 is shown. The preload signal generator 100 adjusts throttle area before and during the transitions between activated and deactivated modes to smooth the torque output of the engine 16. A throttle preload area generator 104 generates a throttle area signal based on a desired airflow per cylinder in deactivated mode ($APC_{Des}$) and engine rpm. The throttle preload area generator 104 can include a lookup table (LUT), a model or any other suitable circuit that generates the throttle preload area signal. The $APC_{Des}$ and engine rpm signals are also input to a preload duration generator 108, which generates a base duration or base period for the throttle preload. The preload duration generator 108 can also include a LUT, a model, or any other suitable circuit that generates the preload duration signal.

In an alternate embodiment, the $APC_{Des}$ and $APC_{Meas}$ signals are initially input to an adaptive throttle preload adjuster 112, which outputs an adjustment signal. The adaptive throttle preload adjuster 112 adjusts for variation in altitude, temperature and vehicle-to-vehicle variations. The adjustment (ADJ) is input to an inverting input of a summer 116. The $APC_{Des}$ is input to a noninverting input of the summer 116. The summer 116 outputs an adjusted desired airflow per cylinder ($APC_{Des\_adj}$), which is input to the preload throttle area generator 104 and the preload duration generator 108. The engine rpm signal is input to the preload throttle area generator 104 and the preload duration generator 108.

The preload area signal that is output by the preload throttle area generator 104 and the duration signal that is output by the preload duration generator 108 are input to a ramp generator 120. Additional inputs to the ramp generator optionally include a ramp_in calibration circuit 124 and a ramp_out calibration circuit 128. The ramp in calibration circuit 124 specifies a ramp in period. Preferably, a gain applied during the ramp in period increases linearly from 0 to 1. Likewise, the ramp out calibration circuit 124 specifies a ramp out period. Preferably, a gain applied during the ramp out period decreases linearly from 1 to 0. Skilled artisans will appreciate, however, that nonlinear slopes or other waveform shapes may be employed during the ramp in and ramp out periods to improve torque smoothing and to prevent throttle noise.

The ramp generator 120 generates a preload area (PL_area) signal that is output to a noninverting input of a summer 140. A current throttle area is input to an inverting input of the summer 140. An output of the summer 140 generates a preload difference or preload delta that is used to adjust the throttle area during cylinder deactivation transitions.

The duration signal is also input to a mode actuator 144. An offset circuit 146 generates a negative offset. The mode actuator 144 generates a hold off complete signal that is used to flag completion of the preload, which starts the transition from activated to deactivated modes. The offset is preferably a negative offset from an end of the base duration. Alternately, the offset can be calculated from the beginning of the base duration or from other suitable signals.

Figure 3:
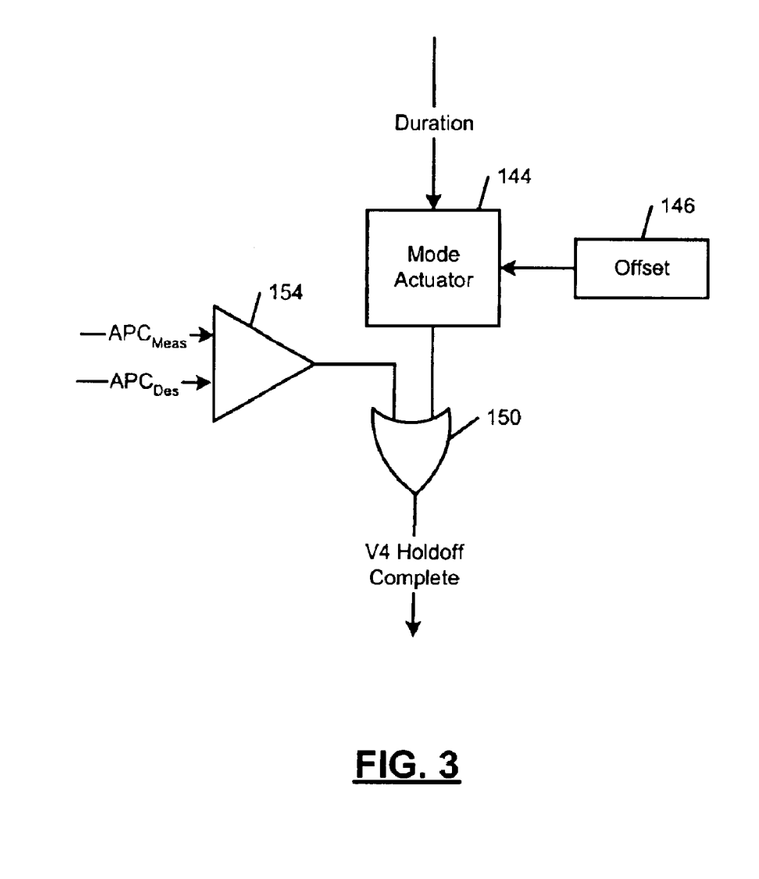
FIG. 3 is a functional block diagram of a modified hold off signal generator according to the present invention that can be used with the throttle preload signal generator of FIG. 2.

Referring now to FIG. 3, a modified method for flagging completion of the transition from activated to deactivated modes is shown. An output of the mode actuator 144 is input to an OR gate 150. A comparator 154 compares $APC_{Meas}$ and $APC_{Des}$. If $APC_{Meas}$ exceeds $APC_{Des}$, the comparator 154 outputs a 1, which signals the transition from activated to deactivated modes.

Figure 4:
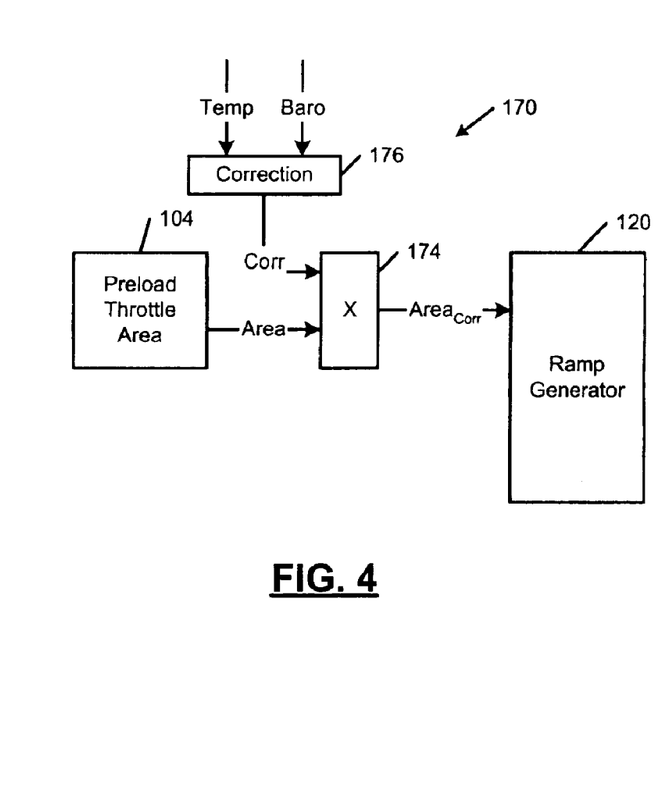
FIG. 4 is a modified preload throttle area signal generator with correction for temperature and/or barometric pressure according to the present invention.

Referring now to FIG. 4, the preload throttle area generator 104 generates the preload area signal that is input to a multiplier 174. A correction circuit 176 receives temperature, barometric pressure, and/or any other suitable input sensor and/or controller signals. The correction circuit 176 generates a correction signal, which is typically a signal from 0.8 to 1.5, although other scales may be used. A corrected area signal is output by the multiplier 174 to the ramp generator 120.

Figure 5:
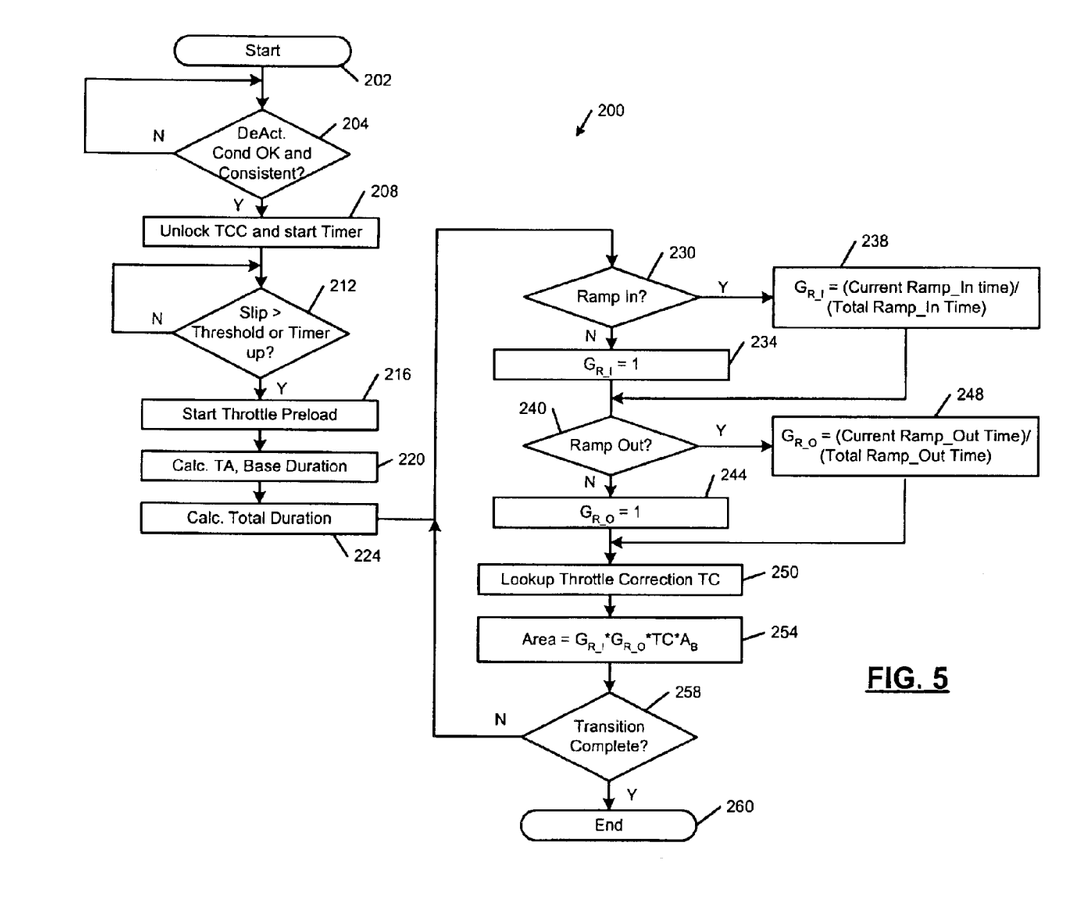
FIG. 5 is a flowchart illustrating steps performed by the engine control system according to the present invention to generate a throttle preload signal.

Referring now to FIG. 5, steps for generating throttle preload are shown at 200. Control begins with step 202. In step 204, the controller 12 determines whether conditions are OK and consistent for deactivation mode. If not, control loops back to step 204. Otherwise, if the vehicle is equipped with an automatic transmission, the controller 12 unlocks a torque converter clutch (TCC) and starts a first timer in step 208. Allowing the torque converter to slip also helps smooth the transitions. In step 212, the controller 12 determines whether the slip exceeds a threshold or the first timer is up. If not, control loops back to step 212. Otherwise, control continues with step 216 and initiates throttle preload. In step 220, control calculates throttle area and base duration. In step 224, the total duration is calculated. The total duration is preferably equal to a sum of the ramp in period, the base period, and the ramp out period.

In step 230, the controller 12 determines whether throttle preload is in the ramp in period. If false, control continues with step 234 and sets the ramp in gain ($G_{R\_I}$) equal to 1. Otherwise, control continues with step 238 and sets the $G_{R\_I}$ equal to (a current location in the ramp in period)/(the total ramp in period). Control continues from steps 234 and 238 with step 240.

In step 240, the controller 12 determines whether throttle preload is in the ramp out period. If false, control continues with step 244 and sets a ramp out gain ($G_{R\_O}$) equal to 1. Otherwise, control continues with step 248 and sets the $G_{R\_O}$ equal to (a current location in the ramp out period)/(the total ramp out period). Control continues from steps 244 and 248 with step 250. In step 250, the controller 12 looks up or calculates a throttle correction TC. In step 254, control sets the throttle area equal to $G_{R\_I}*G_{R\_O}*TC*A_B$, wherein $A_B$ is the base area. In step 258, control determines whether the transition is complete. If not, control loops back to step 230. Otherwise, control ends in step 260.

Figure 6:
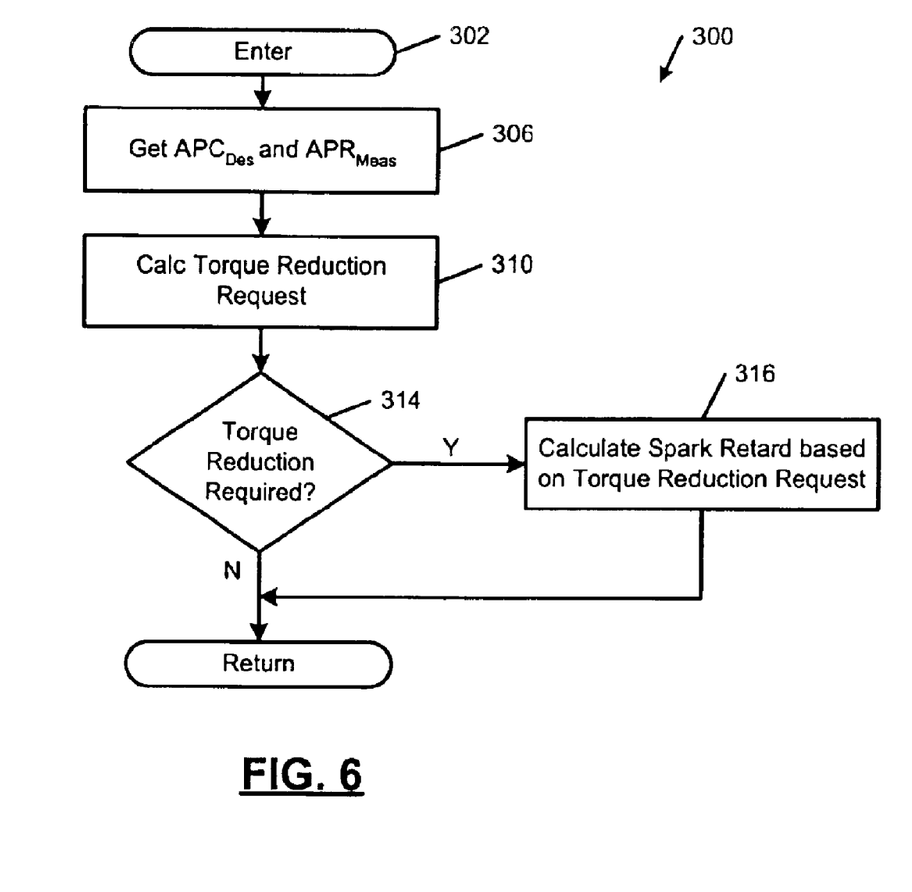
FIG. 6 is a flowchart illustrating steps for retarding spark.

Referring now to FIG. 6, steps for retarding spark are shown generally at 300. Control enters at step 302. In step 306, $APC_{Des}$ and $APC_{Meas}$ are retrieved. A torque reduction request is calculated in step 310. In step 314, the controller 12 determines whether a torque reduction is required. If it is, a spark retard request is calculated in step 316 based on a torque reduction request. Control returns from steps 314 and 316. The spark retard steps that are shown generally at 300 are preferably executed for each cylinder firing event.

Figure 7:
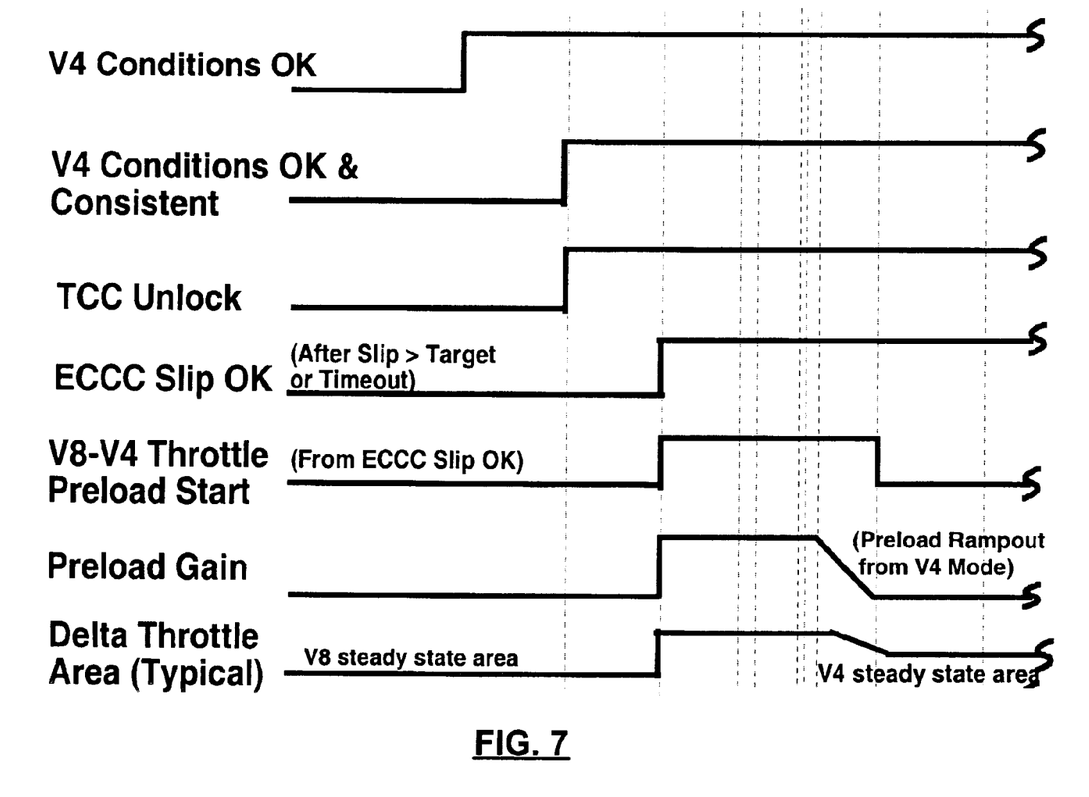
FIGS. 7 and 8 illustrate exemplary control signals for the throttle preload signal generator.
Figure 8:
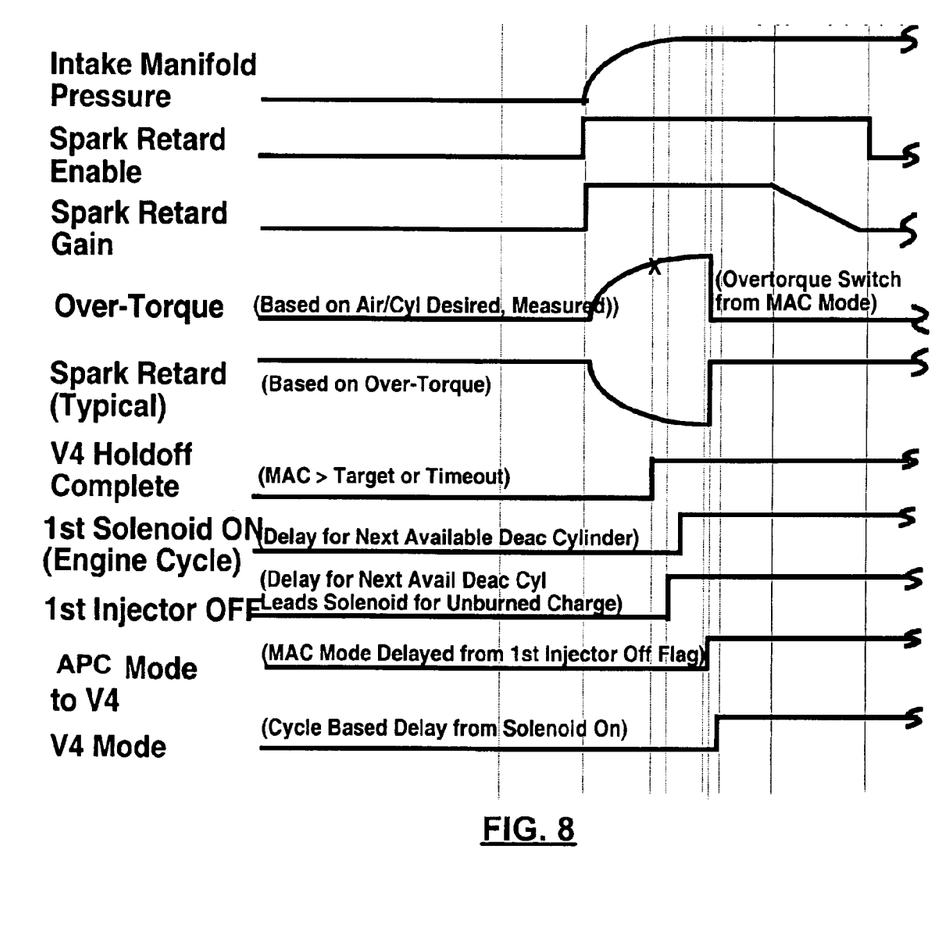

Referring now to FIGS. 7 and 8, exemplary control signals for an eight cylinder engine are shown. A V4 Conditions OK signal is generated to initiate a V8 to V4 transition. A V4 Conditions OK and Consistent signal is generated a first period after the V4 Conditions OK signal is generated to reduce spurious transitions and/or cycling. A Torque Converter Clutch (TCC) unlock signal is preferably triggered at the same time as the V4 conditions OK and Consistent signal.

A fixed time interval after the TCC unlock signal is generated or after the torque converter slip exceeds a target slip, an ECCC Slip OK signal is generated. A V8 to V4 Throttle Preload Start signal is generated based on the ECCC Slip OK signal. A Preload Gain signal is initiated at the same time as the V8 to V4 Throttle Preload Start signal. A typical delta throttle area transition from a steady-state V8 throttle area to a steady-state V4 throttle area is shown.

An intake manifold pressure slowly increases from a V8 mode to a V4 mode. While still in V8 mode, excess torque is generated as a result of the increased manifold pressure. A spark retard signal reduces excess torque. A V4 Mode Hold Off Complete signal is based upon the offset signal subtracted from the end of the preload base duration. Alternately, the V4 Mode Hold Off Complete signal can be based upon the $APC_{Meas}$ exceeding $APC_{Des}$ or after a timer expires.

Once the V4 Hold Off Complete signal goes high, a first deactivation device control solenoid can be turned on and a first injector can be turned off. An APC Mode To V4 signal is generated based upon an event delay from the First Injector Off signal. A V4 mode signal is based upon a event delay from the First Injector Off signal.

Figure 9A:
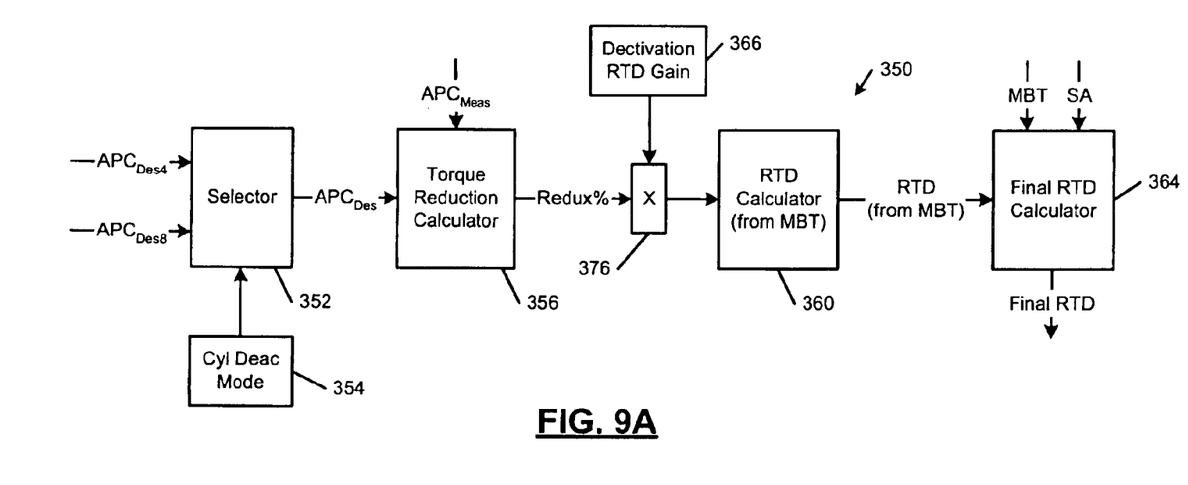
FIG. 9A is a functional block diagram of a spark retard generator for cylinder deactivation.

Referring now to FIG. 9A, a spark retard generator 350 is shown. A signal selector 352 receives a $APC_{Des}$ signal for a deactivated mode such as for a four cylinder $APC_{Des4}$ and a desired APC signal for the activated mode such as for an eight cylinder $APC_{Des8}$. The signal selector 352 selects one of the input signals based upon a signal received from a cylinder deactivation mode circuit 354. For example, the cylinder deactivation mode circuit 354 generates a "1" to identify the deactivated mode and a "0" to identify the activated mode. The signal selector 352 outputs the desired $APC_{Des}$ to a torque reduction calculator 356 that also receives a measured $APC_{Meas}$ signal. In a preferred embodiment, the torque reduction is calculated as follows:

$$1 - \left(\frac{APC_{Des}}{APC_{Meas}}\right).$$

Figure 9B:
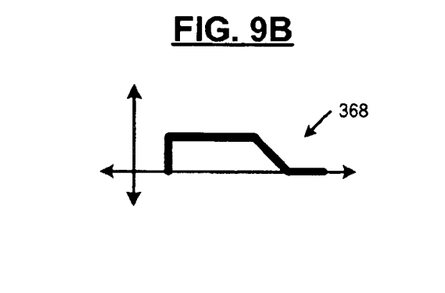
FIG. 9B is an exemplary deactivation gain waveform.

The torque reduction, which is preferably a signal between zero and one or a percentage, is input to a spark retard (RTD) calculator 360. The RTD calculator 360 calculates a RTD from minimum spark advance for best torque (MBT). The RTD calculator 360 can employ a LUT, a model with or without sensor inputs, or any other suitable method. For example, the RTD calculator 360 can calculate RTD from minimum best torque (MBT) based on $APC_{mess}$ and engine rpm to 360. The RTD from MBT is output to a final RTD calculator 364. The final RTD calculator 364 also receives MBT and current spark advance (SA). The final RTD calculator 364 outputs a final RTD signal, which retards spark to reduce torque. A deactivation torque reduction gain circuit 366 may also be provided. In FIG. 9B, a suitable deactivation gain signal is shown. The deactivation RTD gain includes a ramp out 368 that smoothes the deactivation transition.

For example, the RTD calculator 360 generates a RTD signal that is equal to −25 degrees. The final RTD calculator 364 receives an MBT that is equal to 40 degrees and a SA that is equal to 35 degrees. The final RTD calculator outputs a final spark retard of Final RTD=−(MBT+RTD)−(MBT−SA)=−(40−25)−(40−35)=−20.

Figure 10A:
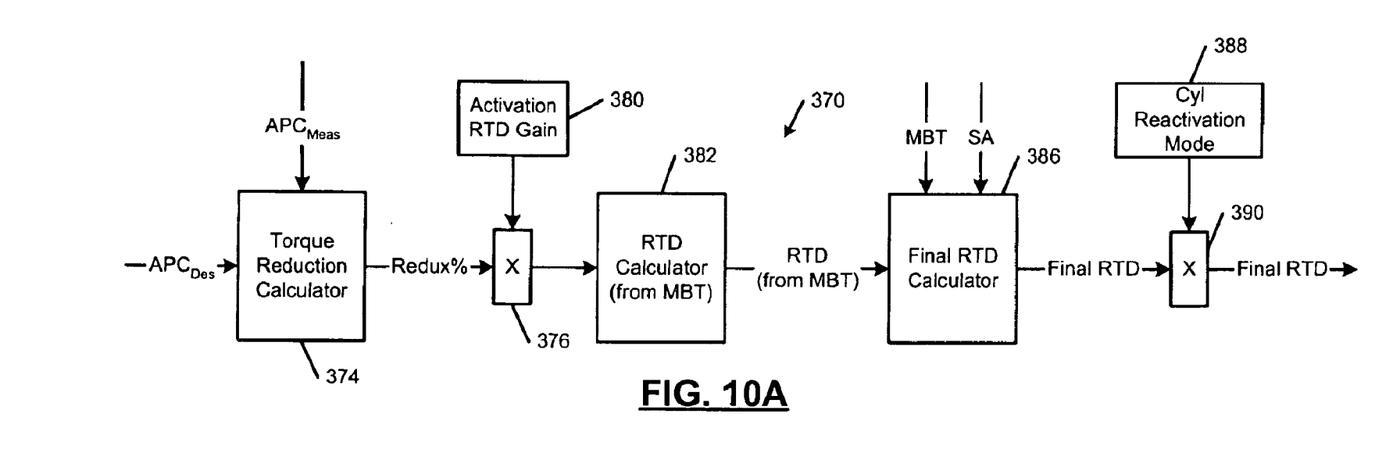
FIG. 10A is a functional block diagram of a spark retard generator for cylinder activation.
Figure 10B:
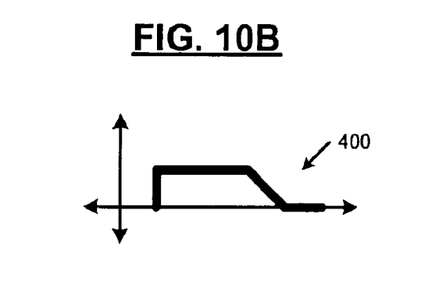
FIG. 10B is an exemplary activation gain waveform.

Referring now to FIGS. 10A and 10B, a RTD generator 370 for cylinder activation is shown. A torque reduction calculator 374 receives $APC_{Des}$ and $APC_{Meas}$ signals and outputs a torque reduction signal to a multiplier 376. An activation torque reduction gain circuit 380 generates a gain signal that is also input to the multiplier 376. An output of the multiplier 376 is input to a RTD calculator 382, which calculates RTD from MBT. A final RTD calculator 386 receives the RTD from MBT, the MBT and the SA signals and calculates the final RTD. A cylinder reactivation mode circuit 388 generates a signal based upon deactivation mode of the engine and outputs the signal to a multiplier 390, which also receives the final spark retard. If the reactivation mode is enabled, the cylinder reactivation mode circuit 388 outputs a "1" and the final spark retard is output. Otherwise, the cylinder reactivation mode circuit 388 outputs a "0", which disables the final spark retard output. In FIG. 10B, a suitable activation gain signal is shown. The activation RTD gain includes a ramp out 400 that smoothes the activation transition.

Airflow estimation is preferable performed using "Airflow Estimation For Engines with Displacement On Demand", U.S. patent Ser. No. 10/150,900, filed May 17, 2002, which is hereby incorporated by reference. Airflow estimation systems developed by the assignee of the present invention are also disclosed in U.S. Pat. Nos. 5.270,935, 5,423,208, and 5,465,617, which are hereby incorporated by reference.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for a displacement on demand internal combustion engine, comprising:

a throttle preload signal generator that outputs a throttle preload area signal having a base portion and ramp out portion; and a combining circuit for combining said throttle preload area signal with a current throttle area signal to generate a throttle preload difference signal that adjusts throttle area to smooth transitions during at least one of cylinder activation and deactivation.

2. The engine control system of claim 1 wherein said throttle preload area signal further includes a ramp in portion which reduces throttle noise.

3. The engine control system of claim 1 further comprising a preload throttle area generator that provides a preload area based on rpm and a desired air per cylinder.

4. The engine control system of claim 3 further comprising a preload duration generator that provides a preload base duration signal based on rpm and a desired air per cylinder.

5. The engine control system of claim 4 further comprising an adaptive throttle preload generator that receives a measured air per cylinder and a desired air per cylinder and that outputs an adjusted air per cylinder.

6. The engine control system of claim 5 wherein said adjusted air per cylinder is input to an inverting input of a summing circuit wherein said desired air per cylinder is input to a noninverting input of said summing circuit, and wherein said summing circuit outputs said adjusted desired air per cylinder to said preload throttle area generator and said preload duration generator.

7. The engine control system of claim 4 further comprising:
a ramp generator that receives said preload area signal and said preload duration signal;
a ramp in calibration circuit that provides a ramp in period; and
a ramp out calibration circuit that provides a ramp out period.

8. The engine control system of claim 4 further comprising:
a mode actuator; and
an offset circuit that generates an offset period, wherein said mode actuator generates a holdoff complete signal at said offset period before an end of said preload base duration signal.

9. The engine control system of claim 4 further comprising:
a mode actuator;
an offset circuit that generates an offset period that is input to said mode actuator;
a comparator that generates a signal when a measured air per cylinder exceeds a desired air per cylinder; and
an OR circuit that is coupled to said mode actuator and said comparator and that generates a holdoff complete signal if said measured air per cylinder exceeds said desired air per cylinder or at said offset period before an end of said preload base duration signal.

10. The engine control system of claim 4 further comprising a correction circuit that adjust said preload throttle area for variations in at least one of temperature and barometric pressure.

11. A method for smoothing transitions in a displacement on demand engine, comprising:
generating a throttle preload area signal having a base portion and ramp out portion;
combining said throttle preload area signal with a current throttle area signal to generate a preload difference signal; and
adjusting throttle area using said preload difference signal to smooth transitions during at least one of cylinder activation and deactivation.

12. The method of claim 11 wherein said throttle preload area signal further includes a ramp in portion.

13. The method of claim 11 further comprising generating a preload area based on rpm and a desired air per cylinder.

14. The method of claim 13 further comprising generating a preload base duration signal based on rpm and a desired air per cylinder.

15. The method of claim 14 further comprising:
receiving a measured air per cylinder and a desired air per cylinder; and
generating an adjusted air per cylinder.

16. The method of claim 15 further comprising generating an adjusted desired air per cylinder based on said adjusted air per cylinder and said desired air per cylinder.

17. The method of claim 14 further comprising:
generating a ramp in period; and
generating a ramp out period.

18. The method of claim 14 further comprising:
generating an offset period;
generating a holdoff complete signal at said offset period before an end of said preload base duration signal.

19. The method of claim 14 further comprising:
generating an offset period;
generating a holdoff complete signal at said offset period before an end of said preload base duration signal;
generating a signal when a measured air per cylinder exceeds a desired air per cylinder; and
generating a holdoff complete signal if said measured air per cylinder exceeds said desired air per cylinder or at said offset period before an end of said preload base duration signal.

20. The method of claim 14 further comprising adjusting said preload throttle area for variations in at least one of temperature and barometric pressure.

* * * * *